(12) United States Patent
Kayanuma et al.

(10) Patent No.: US 8,851,713 B2
(45) Date of Patent: Oct. 7, 2014

(54) LENS MEMBER AND OPTICAL UNIT USING SAID LENS MEMBER

(75) Inventors: Yasuaki Kayanuma, Fujiyoshida (JP); Junji Miyashita, Fujiyoshida (JP)

(73) Assignees: Citizen Electronics Co., Ltd., Yamanashi-Ken (JP); Citizen Holdings Co., Ltd., Tokyo (JP)

(*) Notice: Subject to any disclaimer, the term of this patent is extended or adjusted under 35 U.S.C. 154(b) by 266 days.

(21) Appl. No.: 13/241,138

(22) Filed: Sep. 22, 2011

(65) Prior Publication Data
US 2012/0075870 A1    Mar. 29, 2012

(30) Foreign Application Priority Data
Sep. 29, 2010 (JP) ................................. 2010-220089

(51) Int. Cl.
| F21V 3/00 | (2006.01) |
| F21V 5/04 | (2006.01) |
| F21S 8/10 | (2006.01) |
| G02B 19/00 | (2006.01) |
| G02B 3/08 | (2006.01) |
| F21V 7/00 | (2006.01) |
| F21K 99/00 | (2010.01) |
| F21Y 105/00 | (2006.01) |
| F21Y 101/02 | (2006.01) |
| F21L 4/00 | (2006.01) |

(52) U.S. Cl.
CPC ... F21V 5/04 (2013.01); F21K 9/00 (2013.01); F21S 48/215 (2013.01); G02B 19/0028 (2013.01); F21S 48/236 (2013.01); G02B 3/08 (2013.01); F21Y 2105/001 (2013.01); F21V 5/045 (2013.01); F21S 48/2212 (2013.01); F21Y 2101/02 (2013.01); G02B 19/0061 (2013.01); F21L 4/00 (2013.01); F21V 7/0091 (2013.01)
USPC ........................ 362/311.06; 362/333; 362/339

(58) Field of Classification Search
CPC ........... G02B 6/0053; F21K 9/50; F21K 9/00; F21W 2121/02; F21W 2121/00; F21Y 2101/02; F21V 7/048; F21V 5/046; F21V 5/045; F21V 5/049; F21V 5/02; F21V 5/00; F21V 17/00
USPC ..................................... 362/311.06, 339, 333
See application file for complete search history.

(56) References Cited

U.S. PATENT DOCUMENTS 5,577,492 A * 11/1996 Parkyn et al. .................. 126/698
2009/0002848 A1* 1/2009 Yasumoto et al. ............. 359/742

(Continued)

FOREIGN PATENT DOCUMENTS

| CN | 1343289 A | 4/2002 |
| CN | 1576898 A | 2/2005 |

(Continued)

OTHER PUBLICATIONS

Japanese Office Action in corresponding Japanese Application No. JP2010-220089, mailed Feb. 17, 2014 (With English Translation).

(Continued)

*Primary Examiner* — Julie Bannan
(74) *Attorney, Agent, or Firm* — Browdy and Neimark, PLLC

(57) ABSTRACT

A lens member includes a central axis, a light-incident side including a Fresnel-lens surface provided with a plurality of annular prisms concentrically arranged with respect to the central axis, and a light-exit surface opposite to the light-incident side. The Fresnel-lens surface further includes an annular lens portion that is concentrically arranged with respect to the central axis and that is extended to be longer and wider than the plurality of annular prisms. Provided is an optical unit in which a light source and a lens member are combined, and parts are disposed in a space provided in an outer periphery of the annular lens portion.

21 Claims, 5 Drawing Sheets

(56) References Cited

U.S. PATENT DOCUMENTS

| | | |
|---|---|---|
| 2010/0177526 A1* | 7/2010 | Futami .......................... 362/519 |
| 2010/0284194 A1 | 11/2010 | Miyashita |
| 2011/0249452 A1* | 10/2011 | Chen et al. .................... 362/339 |

FOREIGN PATENT DOCUMENTS

| | | |
|---|---|---|
| JP | 57-55002 | 4/1982 |
| JP | S58-014405 A | 1/1983 |
| JP | 59-119340 | 7/1984 |
| JP | UH03-116508 A | 12/1991 |
| JP | 05-281402 | 10/1993 |
| JP | H08-500449 A | 1/1996 |
| JP | 2002-043629 A | 2/2002 |
| JP | 2003-287792 A | 10/2003 |
| JP | 2010-262187 | 11/2010 |
| JP | 2011-141450 | 7/2011 |
| WO | 93/21484 A1 | 10/1993 |

OTHER PUBLICATIONS

Chinese Official Action dated Aug. 5, 2014, in connection with corresponding Chinese Application No. 201110361884.

* cited by examiner

LENS MEMBER AND OPTICAL UNIT USING SAID LENS MEMBER

CROSS-REFERENCE TO THE RELATED APPLICATION

This application is based on and claims the priority benefit of Japanese Patent Application No. 2010-220089, filed on Sep. 29, 2010, the disclosure of which is incorporated herein by reference in its entirety.

BACKGROUND OF THE INVENTION

1. Field of the Invention

The present invention relates to a lens member used in, for example, light-emitting diode (LED) lighting, and the like and an optical unit including the lens member.

2. Related Art Statement

LED optical products such as lighting, projectors, flash, headlights and tail lamps of automobiles and the like, in which an LED is utilized as a light source, or basic optical devices such as a narrow directivity LED, and so on, generally use a lens for focusing or collimating light emitted from the LED. Although a convex refractive lens is usually employed for this kind of lens, adoption of a Fresnel-lens with the aim of height reduction and thinning is also proposed.

For example, there is proposed a lens for a lamp fitting which has a lattice-shaped refracting prism portion formed in a central portion of an inner surface near an optical axis, and also has a lattice-shaped reflecting prism portion formed in a peripheral portion of this lattice-shaped refracting prism portion (refer, for example, to JP 57-55002 A).

In addition, there is proposed a Fresnel-lens in which a part of the prisms of a Fresnel-lens surface acting as a light-entrance surface is formed such that a part of the entering light rays are emitted from a light-exit surface after being totally internally reflected at a non-lens surface (refer, for example, to JP S59-119340 A). Furthermore, there is proposed an optical device configured from a refractive lens portion having a lens body provided at a central portion of the optical axis and a reflecting body portion, the reflecting body portion allowing light rays to enter from an inner surface portion and totally internally reflecting the light rays at a paraboloid-shaped reflecting surface, thereby converting the light rays into a parallel beam (refer, for example, to JP H05-281402 A).

There have been proposed by the inventors of the present application a lens member and an optical device which include a Fresnel-lens surface in which a light-incident surface and a light-exit surface of a TIR lens are divided into light-incident surfaces and light-exit surfaces of a plurality of annular prisms whose positions are suitably and concentrically arranged with respect to a central axis of the lens member (see JP2010-262187A, JP2011-141450A and US2010/0284194A1).

If such a lens member including a Fresnel-lens surface as proposed above is used for a illumination device, it is often the case that a light-emitting surface of a light source including at least one LED element is smaller than the Fresnel-lens surface that is disposed to face the light-emitting surface of the light source. In this case, since a central axis of the Fresnel-lens surface of the lens member is disposed to be coincident with a center of the light-emitting surface of the light source, there is a space in a direction perpendicular to the central axis, around the light source. To utilize such a space, parts such as resistances, condensers, connecters and so on for a power circuit may be mounted in the space around the light source.

However, if parts are arranged in the space under the Fresnel-lens surface around the light source, the parts adjacent to the light source may interfere with light emitted from the light source and entering the Fresnel-lens surface. Accordingly, there is a possibility that the optical member cannot exert its optical characteristics when parts are arranged in a space around the light source.

SUMMARY OF THE INVENTION

An object of the present invention is to provide a lens member and an optical unit in consideration of above mentioned.

To accomplish the above object, a lens member according to an embodiment of the present invention includes a central axis, a light-incident side including a Fresnel-lens surface provided with a plurality of annular prisms that are concentrically arranged with respect to the central axis, and a light-exit surface opposite to the light-incident side.

The annular lens portion is concentrically arranged with respect to the central axis in a part of the Fresnel-lens surface of the lens member. The annular lens portion may be positioned at an outer peripheral portion of the Fresnel-lens surface. Some of the plurality of annular prisms may be positioned outside of the annular outer surface of the annular lens portion.

The Fresnel-lens surface further includes an annular lens portion that is concentrically arranged with respect to the central axis and that is extended to be longer and wider than the plurality of annular prisms.

The annular lens portion include an annular inner surface and an annular outer surface that is positioned outside the annular inner surface. The annular inner surface and the annular outer surface may be in contact with each other to form a common lower edge and make a shape of an acute angle at the common lower edge. In the annular lens portion, the annular inner surface and the annular outer surface may be inclined surfaces each having an angle with respect to the central axis.

In another embodiment, an annular lens portion includes an annular inner surface, an annular outer surface, and an annular inclined surface connecting a lower end of the annular inner surface and a lower end of the annular outer surface of the annular lens portion. The annular inner surface and the annular outer surface of the annular lens may be extended parallel to the central axis and extended below the light-incident side. The annular inner surface may be extended to be longer than the annular outer surface. In this case, the annular inclined surface inclining upward from the lower end of the annular inner surface to the lower end of the annular outer surface.

In still another embodiment, an annular lens portion includes an annular inner surface and an annular outer surface extending parallel to the central axis, respectively. In an example, the annular inner surface introduces light emitted from the light source therein. The annular outer surface refracts and reflects a part of the light entered the annular inner surface to direct toward annular prisms positioned outside the annular lens portion.

In still another embodiment, an annular lens portion is provided on an outer peripheral edge of a Fresnel-lens surface. The annular lens portion includes an annular inner surface and an annular outer surface positioned outside the annular inner surface. The annular outer surface may be a shape reflecting light entered the annular inner surface toward a light-exit surface.

In still another embodiment, a light-exit surface of a lens member has a planar surface.

In still embodiment, a plurality of convex portions is provided on the light-exit surface at a position above an annular lens portion.

A lens member according to the present invention includes a flat shape as a whole, and includes a concave-shaped surface provided on a light-incident side on a central axis, a Fresnel-lens surface may be provided on the concave-shaped surface. A raised surface having the largest thickness is provided on a central axis in the concave-shaped surface, and a Fresnel-lens surface may be provided on a continuous surface of the concave-shaped surface and the central raised surface. Even in such a case, the annular lens portion extends long to a light-incident surface more than the raised surface having an increased thickness on the central axis.

An optical unit according to one embodiment of the present invention includes the lens member as mentioned above, a light source including a light-exit surface having a smaller area than that of a Fresnel-lens surface of the lens member, and at least one part positioned outside the light source in a direction perpendicular to a central axis at a lower side of a light-incident side of the lens member. The light source and the part are mounted on a substrate positioned below the light-incident side of the lens member.

The part is positioned outside an annular lens portion of the lens member in the direction perpendicular to the central axis. The part is positioned outside the annular lens portion in the direction perpendicular to the central axis and positioned below an outer peripheral portion of the Fresnel-lens surface of the lens member. A frame to support an outer peripheral portion of the lens member so that a center of the light-exit surface of the light source is positioned on the central axis of the lens member may be provided.

DETAILED DESCRIPTION OF THE PREFERRED EMBODIMENTS

Figure 1:
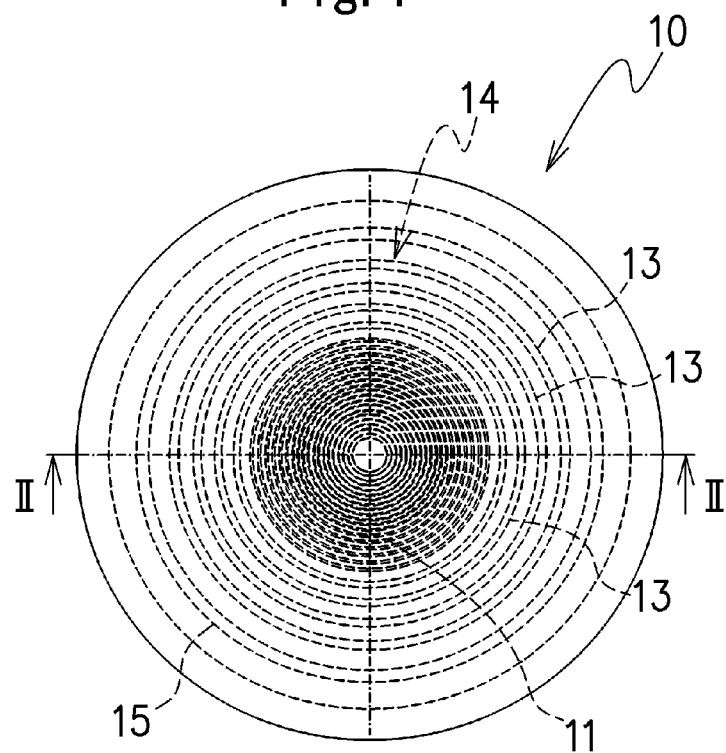
FIG. 1 is a plan view of a lens member according to a first embodiment of the present invention.

The present invention now will be described more fully hereinafter with reference to the accompanying drawings, in which embodiments of the invention are shown. The present invention may, however, be embodied in many different forms and should not be construed as limited to the specific embodiments set forth herein. Rather, these embodiments are provided to convey the scope of the invention to those skilled in the art. In the drawings, the size and relative sizes of layers and regions may be exaggerated for clarity.

Figure 2:
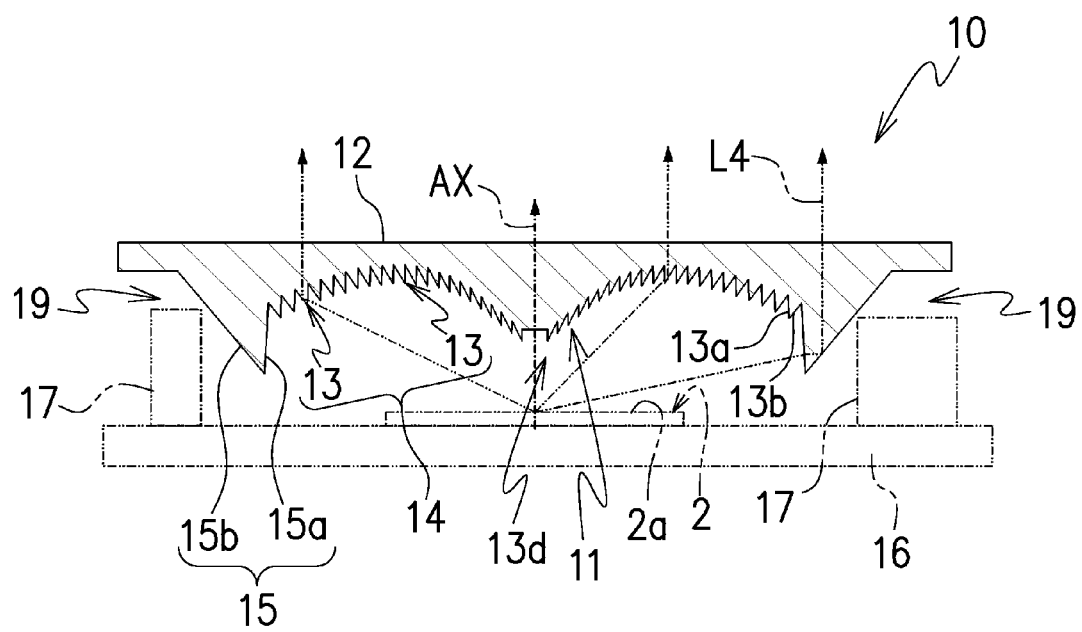
FIG. 2 is a cross-sectional view taken along the line II-II of the lens member shown in FIG. 1.

FIGS. 1 and 2 illustrate a lens member 10 according to a first embodiment of the present invention. Reference sign AX shows a central axis that is an imaginary line passing through a center of the lens member 10. More specifically, the lens member 10 in the first embodiment includes the central axis AX, a light-incident side 11 including a Fresnel-lens surface 14 provided with a plurality of annular prisms 13 that are concentrically arranged with respect to the central axis AX. The Fresnel-lens surface further includes an annular lens portion 15 that is concentrically arranged with respect to the central axis AX, and the annular lens portion 15 is extended to be wider in a direction perpendicular to the central axis AX than the plurality of annular prisms and is extended to be longer in a direction parallel to the central axis below the light-incident side 11 than the plurality of annular prisms 13. In this embodiment, the annular lens portion 15 includes an annular inner surface 15a and an annular outer surface 15b positioned in a direction perpendicular to the central axis AX outside the annular inner surface 15a. The annular inner surface 15a and the annular outer surface 15b are in contact with each other to form a common lower edge and make an acute angle at the common lower edge by the annular inner surface 15a and the annular outer surface 15b. The annular inner surface 15a and the annular outer surface 15b are inclined surfaces having respective angles with respect to the central axis AX.

Each of the plurality of annular prisms 13 of the Fresnel-lens surface includes an annular inner surface 13a and an annular outer surface 13b positioned in a direction perpendicular to the central axis AX outside the annular inner surface 13a. In each of the prisms, light received through the annular inner surface 13a is totally reflected on the annular outer surface 13b toward the light-exit surface 12.

Since the lens member 10 includes a Fresnel-lens surface 14, its configuration is conceptually described with reference to FIGS. 3 and 4.

Figure 3:
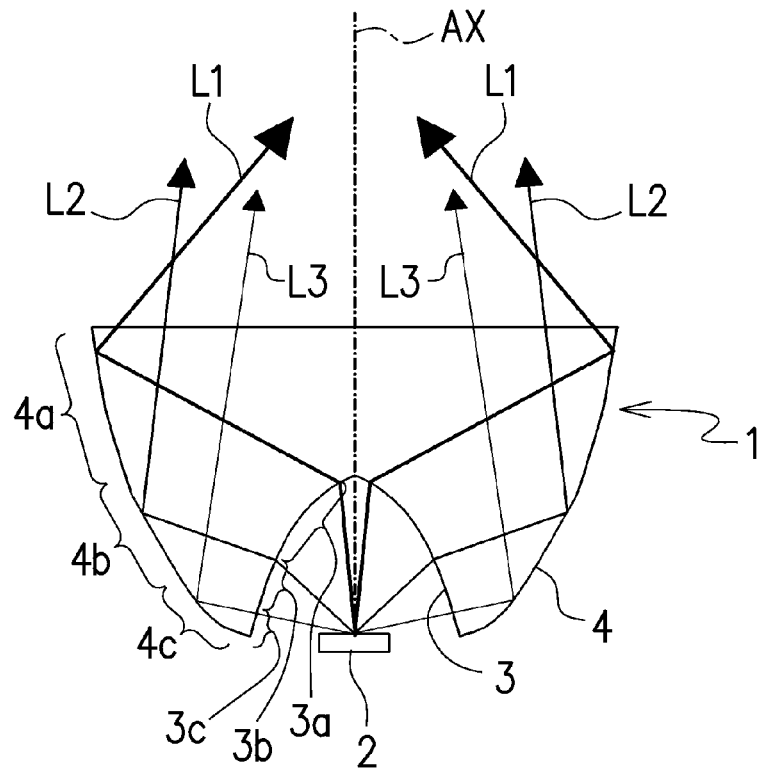
FIG. 3 is an explanatory diagram showing a principle of a TIR lens.

As shown in FIG. 3, the TIR lens 1 is generally a bulky lens and includes a light-incident surface 3 and a light-reflection surface 4 positioned in a direction perpendicular to a central axis AX outside the light-incident surface 3. To reduce thickness of such a bulky lens and achieve a desired light emission in which light is exited through the light-exit surface of the lens member as most intensified light at a center of the light-exit surface of the lens member and the light is exited so that the light intensity gradually decreases with increasing distance from the center, a lens member including a Fresnel-lens surface is proposed (see JP2010-262187A, JP2011-141450A and US2010/0284194A1). For more details, the light-incident surface 3 is divided into a plurality of divided light-incident surfaces 3a to 3c and the light-reflection surface 4 is divided into a plurality of divided light-reflection surfaces 4a to 4c, and combinations of divided light-incident surfaces and divided light-reflection surfaces are repositioned as a plurality of annular prisms 14. As shown in FIG. 3, the most intensified light which passes through the light-incident surface at 3a and is reflected on the light-reflection surface at 4a to be directed toward a light-exit surface is L1, the less intensified light L2 than the most intensified light L1 passes through the light-incident surface at 3b and is reflected on the light-reflection surface at 4b to be directed toward the light-exit surface, and the least intensified light L3 of all passes through the light-incident surface at 3c and is reflected on the light-reflection surface at 4c to be directed toward the light-exit surface. Accordingly, the less intensified light L2 which is more intensified light than the least intensified light L3 is exited through the light-exit surface, in a direction perpendicular to the central axis AX outside the least intensified light L3. However, as shown in FIG. 4, the lens member 11 has a plate shape as a whole and includes a Fresnel-lens surface 11 at a light-incident side. The Fresnel-lens surface 11 is provided with a plurality of annular prisms 14 that are concentrically arranged with respect to the central axis AX of the lens member 10A. Each of the plurality of annular prisms 14 includes an annular inner surface 13a and an annular outer surface 13b that is positioned in a direction perpendicular to the central axis AX outside the annular inner surface 13a. The annular prisms 14 of the lens member 10A are repositioned as annular prisms 13C, 13B, 13B, and 13A from the light-incident surface 3 and the light-reflection surface 4 of the bulky lens 1 to exit a desired light. Of course, the number of the annular prisms in the drawings is exaggerated for explanation and not limited thereto.

Consequently, the lens member 10 of the present invention may have a Fresnel-lens surface mentioned above. The lens member 10 according to the first embodiment has a plate-shape as a whole. The plurality of annular prisms 13 including a plurality of annular inner surfaces 13a and annular outer surfaces 13b of the Fresnel-lens surface 14 may have different light-refracting angles with respect to each other. The Fresnel-lens surface 11 of the lens member 10 is disposed to face a light-emitting surface 2a of a light source 2 with the central axis AX and the center of the light-emitting surface 2a of the light source 2 being coincident with each other. The light source 2 may include at least one LED element. Note that the lens member 10A including the Fresnel-lens surface 11 may be integrally formed by a light-transmitting resin such as acryl resin. Such a provision of the Fresnel-lens surface 14 makes it possible to form a light-exit surface which obtains the strongest light at a central portion and light intensity gradually decreases with increasing distance from the center of the lens member to a peripheral portion in a direction perpendicular to the central axis AX.

Light emitted along the central axis AX from the light source 2 and light emitted with an angle to the central axis AX enter the annular inner surfaces 13a of annular prisms 13, are all reflected on the annular outer surfaces 13b and directed toward the light-exit surface 12.

The annular inner surface 13a of each of the annular prisms 13 may be formed by a planar surface or convex-shaped quadratic surface, but is preferably formed by a planar surface in consideration of workability. On the other hand, the annular outer surface 13b may be formed by a planar surface or aspheric surface such as a paraboloidal surface, hyperboloid surface, elliptical surface or the like, but is preferably formed by the planar surface in consideration of workability of minute annular prisms. Meanwhile, in the first embodiment, the light-exit surface 12 opposite to the Fresnel-lens surface 14 includes a flat surface.

The annular lens portion 15 of the lens member 10 is provided on an outer peripheral edge portion of the Fresnel-lens surface 14 that includes the plurality of annular prisms 13. The annular lens portion 15 is concentrically arranged with respect to the central axis AX. In other words, the annular lens portion 15 is formed in an annular shape about the central axis AX. The annular lens portion 15 includes an annular inner surface 15a and an annular outer surface 15b positioned in a direction perpendicular to the central axis AX outside the annular inner surface 15a, a lower edge of the annular inner surface 15a and a lower edge of the annular outer surface 15b are in contact with each other to form a common lower edge and make an acute angle at the common lower edge.

Because the annular lens portion 15 is extended to be longer and wider than the plurality of annular prisms 13. For more details, the annular lens portion 15 is disposed wider in a direction perpendicular to the central axis AX and longer in a direction of the central axis AX than the plurality of annular prisms. Also, the annular lens portion 15 is concentrically arranged with respect to the central axis AX, and is concentrically arranged outside the plurality of annular prisms 13, and therefore, it is possible to direct light that is emitted from the light source 2 with a wider incident angle tilting wider in a direction perpendicular to the central axis AX than light that is emitted from the light source 2 with an acute incident angle, toward the light-exit surface.

The annular lens portion 15 is provided in a part of the Fresnel-lens surface, but the annular lens portion is not Fresnel-ized. For example, of divided light-incident surfaces 3a to 3c and divided light reflection surfaces 4a to 4c of a bulky lens shown in FIG. 3, the divided light-incident surface 3c shorter than other divided light-incident surfaces 3a and 3b and the divided light reflection surface 4c shorter than other divided light-reflection surfaces 4a and 4b are not Fresnel-ized and disposed at an outer peripheral portion of the Fresnel-lens surface 14 as the annular lens portion 15. In other words, the thickness of the lens member 10 is kept thin enough, even if the shorter divided light-incident surface 3c and the shorter light reflection surface are not Fresnel-ized or not divided into some annular prisms.

The annular lens portion 15 includes the annular inner surface 15a that receives light emitted from the light source 2 with a wide angle with respect to the central axis AX and the annular outer surface 15b that totally reflect the received light received through the annular inner surface 15a toward the light-exit surface 12. That is, the annular lens portion 15 has approximately a V-shape in section and the annular lens portion 15 is concentrically arranged with respect to the central axis AX of the lens member. The annular inner surface 15a and the annular outer surface 15b of the annular lens portion 15 are in contact with each other to form a common lower edge and make an acute angle at the common lower edge.

An annular flat surface or aspheric chamfer may be provided at the common lower edge of the annular inner surface 15a and the annular outer surface 15b. In this case, there are advantageous effects that, when the lens member 10 is formed by a mold, because a pointed lower edge of the lens portion 15 easily chips or cracks when the lens member 10 is accidentally dropped. If a chamfer is provided between the annular inner surface and the annular outer surface, it is possible to avoid an easy break of the lens member 10.

Figure 4:
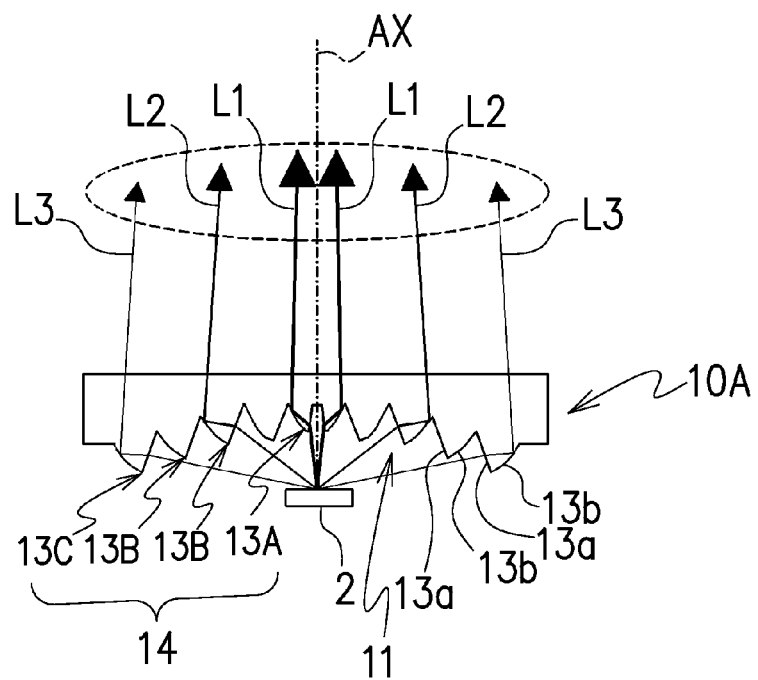
FIG. 4 is an explanatory diagram showing a principle of the lens member including a Fresnel-lens surface.

The annular lens portion 15 is disposed instead of some of the annular prisms 13 which are supposed to be provided on the outer peripheral portion of the Fresnel-lens surface 14 (conceptually, corresponding to a part or entirety of the annular prism 13C as shown in FIG. 4) and the annular lens portion 15 has a projecting portion which is extended below the light-incident side 11 longer than the plurality of annular prisms 13. Because the annular lens portion 15 extends to be wider and longer below the light-incident side 11 than the plurality of annular prisms 13, the annular lens portion can receive light emitted from the light source 2 with a wide angle with respect to the central axis AX, of light emitted from a light-emitting surface 2a of the light source 2 that is disposed to face the Fresnel-lens surface 14 of the lens member 10 and reflects upward and/or refracts the received light. The annular lens portion 15 configured to change a light path of light emitted from the light source 2 with a wide angle is disposed in a direction perpendicular to the central axis AX outside the light-emitting surface 2a of the light source 2.

In this way, when the lens member 10 and the light source 2 are disposed to form a unit, since the light-emitting surface 2a of the light source 2 has an area smaller than an area of the Fresnel-lens surface 14, a space around the light source 2 under the periphery of the lens member can be used. According to the present invention, with a peripheral lens portion provided, light emitted from the light source with an angle in a direction perpendicular to the central axis AX can be received by the Fresnel-lens surface and the space around the light source 2 can be used to dispose separate parts or members. It is possible to adjust a light pass so that light emitted at a wide angle from the light source 2 is also effectively emitted from the light-exit surface 12 of the lens member 10 by the annular lens portion 15 provided on a part of the Fresnel-lens surface 14 of the lens member 10.

In the annular lens portion 15, the annular inner surface 15a and the annular outer surface 15b are formed by a planar surface or aspheric surface such as a paraboloidal surface, hyperboloid surface, elliptical surface or the like, but are preferably formed by the planar surface in consideration of workability.

The light source 2 may include a plurality of LED elements. For example, a light source including a plurality of LED elements arranged in a grid-like shape may be adopted and the light source 2 may be formed by only one LED element.

According to the present invention, it is possible to dispose electronic parts in an outer peripheral space around the light source 2 and to maintain an optical characteristic of the lens member 10, when the Fresnel-lens surface 14 of the lens member 10 which is thinned as exemplified is used to face the light-emitting surface 2a of the light source 2. By a shape or position of the annular lens portion 15 provided on the lens member 10, it is possible to receive light at a wide angle from the light source 2 and enhance significantly use efficiency of the light, and align a distribution of the light emitted from the light-emitting surface 2a of the light source 2.

More specifically, it is often the case that the light-emitting surface 2a of the light source 2 disposed to face the Fresnel-lens surface 14 of the lens member 10 is lesser than the Fresnel-lens surface 14 of the lens member 10 in area. In this case, although it is considered to use the lens member by bring the Fresnel-lens surface 14 of the lens member 10 which is disposed to face the light-exit surface close to the light-emitting surface 2a of the light source 2, there is possibility that parts for a power circuit (resistance, condenser, connector or the like) are mounted in vicinity of an outer periphery of the light source 2 having the light-emitting surface 2a of the area smaller than that of the Fresnel-lens surface 14, that is, in a position facing neighborhood of an outer periphery of the Fresnel-lens surface 14 of the lens member 10, because of an object making effective use of the space or request for miniaturization of an optical device.

Next, the entrance and the emission of light emitted from the light source 2 in the lens member 10.

Light emitted from the light source 2 is light on the optical axis, that is to say, most intensified light is emitted to a direction along the central axis AX of the lens member 10 is strongest. However, light from the light source 2 is entered the Fresnel-lens surface 14 with a light-incident angle from a narrow angle to a wide angle with respect to the central axis AX as going away from the central axis AX to an outer periphery end of the Fresnel-lens surface 14. In a flat lens having the Fresnel-lens surface 14, it is possible to effectively use a space in a horizontal direction perpendicular to the central axis AX by providing the annular lens 15 on a part of the Fresnel-lens surface 14 and implementing the present invention.

In addition, in the lens member 10 as shown in the first embodiment, the light-incident side 11 includes a Fresnel-lens surface provided with a plurality of annular prisms concentrically arranged with respect to the central axis AX on a continuous surface continuously formed by a concave-shaped surface and a raised surface that is disposed on the central axis and in the center of the concave-shaped surface, a light-exit surface opposite to the light-incident side 11 and the Fresnel-lens surface further includes an annular lens portion that is concentrically arranged with respect to the central axis and that is extended longer and wider than the plurality of annual prisms. The annular lens portion is extended below the light-incident side longer than the raised surface at the central axis AX. More specifically, the Fresnel-lens surface 14 has a structure in which a central portion and an outer peripheral edge portion are projected more beneath than the light-incident side 11 and the light-incident side 11 has a concaved shape between the central portion and the outer peripheral edge portion. A plurality of concentric annular prisms 13 about the central axis AX are continuously formed on the continuous surface 13c comprising the concave-shaped surface and the central raised surface from a periphery of the central axis AX toward the direction perpendicular to the central axis AX. With this shape, the lens member has a structure easy to pick up light emitted from the light source 2 with a wide angle at the annular prisms 13 provided on the outer peripheral edge projecting below the light-incident side 11, while the light emitted from the light source 2 with a wide angle can efficiently be picked up by providing further the annular lens portion 15 on a part of the Fresnel-lens surface 14 extending to be long and wider than the plurality of annular prisms provided on the Fresnel-lens surface 14.

Next, the light source including the light-exit surface having an area smaller than that of the Fresnel-lens surface of the lens surface, and the light-entrance and the light-emission at the annular lens portion 15 provided on an outer peripheral side of the light source in the direction perpendicular to the central axis are explained.

Figure 5:
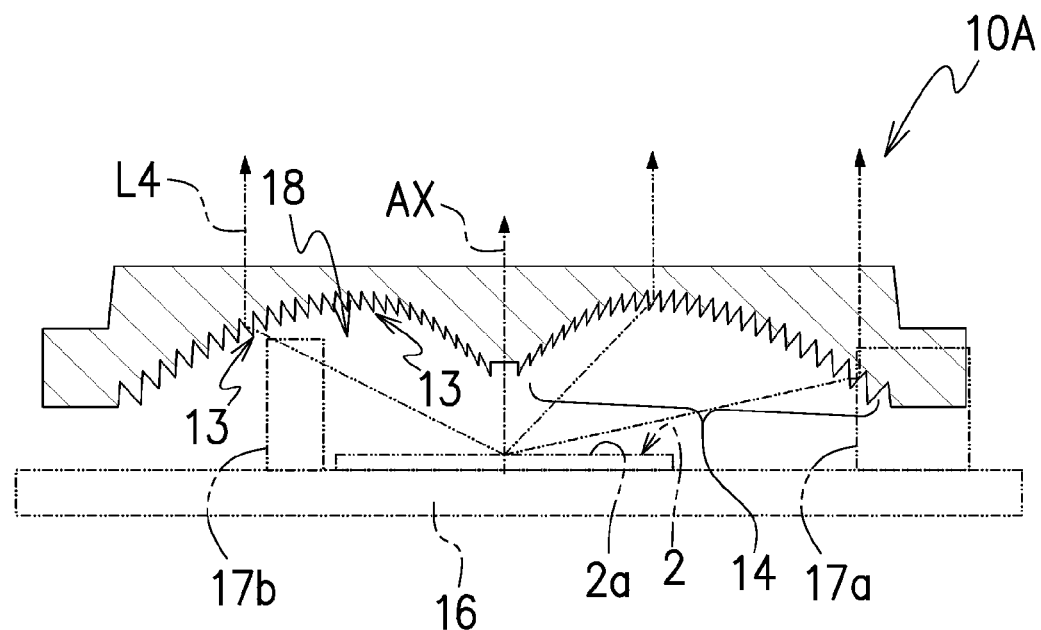
FIG. 5 is a sectional view showing one example of the lens member in which an annular lens portion is not provided and explaining a positional relationship between a light source and a substrate.

For example, in a lens member 10A shown in FIG. 5, the annular lens portion 15 according to the present invention is not provided on the Fresnel-lens surface 14. However, an outer peripheral portion of the Fresnel-lens surface 14 corresponds to a peripheral edge portion of a concave-shaped surface formed on the light-incident side 11. The outer peripheral portion is disposed to approach a substrate 16 on which the light source 2 is mounted, to pick up light emitted from the light source 2 at a wide angle. Therefore, for example, if a user intends to mount parts 17a for a power circuit on the substrate 16 in a vicinity of the outer peripheral portion of the annular prisms 13, there is possibility that a function of the lens member 10A cannot sufficiently be exerted for the interference of the outer peripheral portion of the annular prisms 13 and the parts 17a.

Therefore, without providing the outer peripheral portion of the annular prisms 13, if parts 17b for a power circuit are mounted in a space 18 in which a relatively large gap can be formed between the annular prisms 13 and the substrate 16, light emitted from the light source 2 with a wide angle is blocked by the parts 17b for a power circuit, and the light cannot be entered the annular prisms 13, thereby the deterioration of optical performance such as the reduction of brightness occurs. Therefore, in the first embodiment, as shown in FIG. 2, the annular lens portion 15 is provided on the outer peripheral portion of the annular prisms 13, and parts 17 for a power circuit are mounted in an empty space 19 of an outside area of the annular lens portion 15. Light L4 emitted from the light source 2 with a wide angle is entered an annular inside surface 15a of the annular lens portion 15, reflected totally on an annular outside surface 15b and emitted from the light-exit surface 12 which is disposed upward. Therefore, the annular prisms 13 positioned on the outer peripheral portion changing a light path of the light L4 emitted with a wide angle are not required, so the space 19 to mount the parts 17 is secured below the lens member 10 at the outer peripheral portion of the annular lens portion 15.

Figure 6:
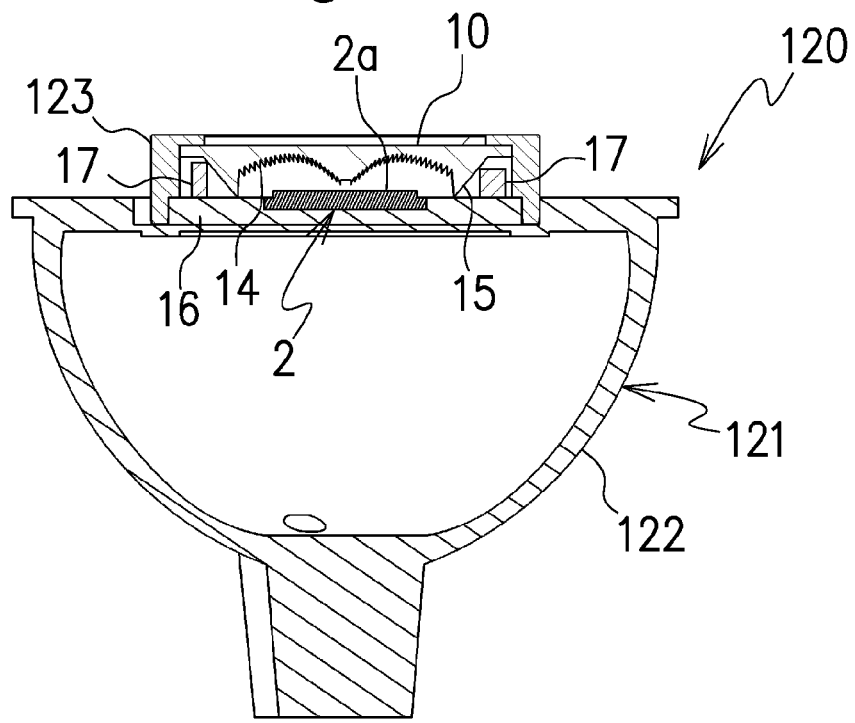
FIG. 6 is a sectional view of an optical unit in which the lens member according to the first embodiment is assembled.
Figure 7:
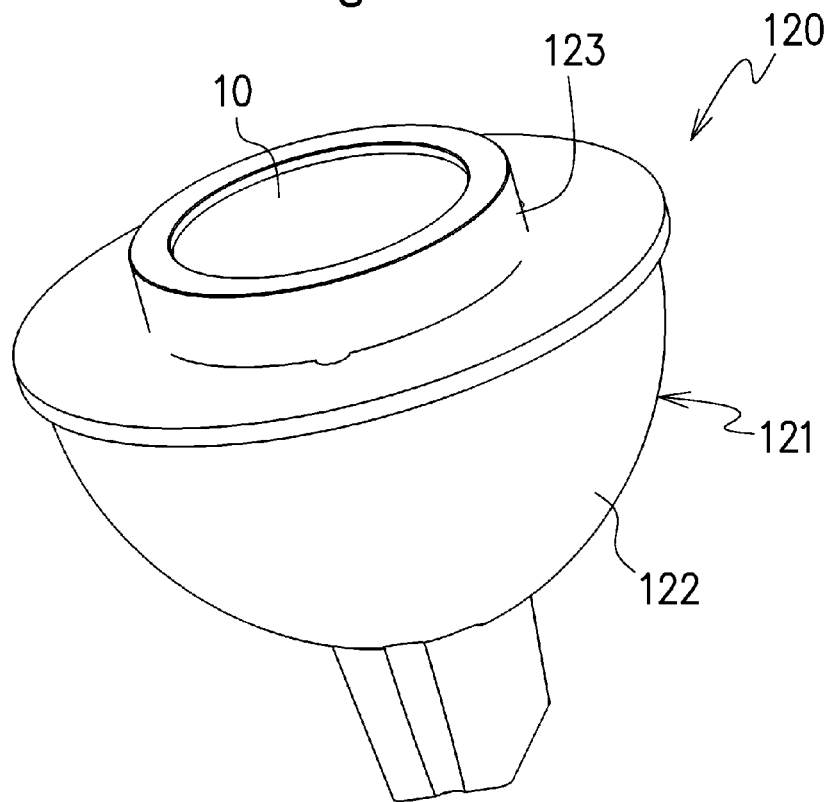
FIG. 7 is a perspective view of the optical unit shown in FIG. 6.

Next, an optical unit in which the lens member 10 structured as mentioned above is assembled is explained. As shown in FIGS. 6 and 7, the optical unit 120 includes the lens member 10 having the Fresnel-lens surface 14 and the annular lens portion 15, as mentioned above, a light source 2 including the light-emitting surface 2a having an area smaller than that of the Fresnel-lens surface 14 of the lens member 10, a substrate 16 disposed to face the light-incident side 11 of the lens member 10, the parts 17 for the power circuit, mounted on the substrate 16 below the Fresnel-lens surface 14 at a position outside the annular lens portion 15, and a casing 121 to house the aforementioned components. The light source 2 is mounted on the substrate 16 so that a center of the light-emitting surface 2a of the light source 2 is positioned on the central axis AX.

The casing 121 includes a hemispherical portion 122 and an upper surface portion provided to close the hemispherical portion 122. The lens member 10 including the Fresnel-lens surface 14 disposed to face the light-exit surface of the light source 2 is disposed on a central portion of the upper surface portion. A frame 123 supporting an outer peripheral portion of the lens member 10 is provided so that a center of the light-emitting surface 2a of the light source 2 is aligned with the central axis AX of the lens member 10. The frame 123 has approximately a cylindrical shape, whose central axis aligns with a central axis of the hemispherical portion 122, and disposed on the upper surface portion of the hemispherical portion 122 in a state where the lens member 10 is disposed to face the light source 2.

As mentioned above, in the lens member 10 according to the first embodiment, because the annular lens portion 15 is provided on an outer peripheral portion of the Fresnel-lens surface 14 comprising the plurality of annular prisms 13 concentrically arranged with respect to the central axis AX, a light path of light emitted from the light source 2 at a narrow angle is changed by the annular prisms 13 arranged inside the annular lens portion 15 in a direction perpendicular to the central axis AX to be directed to the light-exit surface 12, and a light path of light emitted from the light source 2 at a wide angle is changed by the annular lens portion 15 to be directed to the light-exit surface 12. In this way, because the light path of the light emitted from the light source 2 at the wide angle can be changed by the annular lens portion 15, it is possible to acquire a large space between the lens member 10 and the substrate 16 outside the annular lens portion 15, and secure a space 19 for mounting the parts 17 for the power circuit therein.

As mentioned above, the optical unit 120 includes the lens portion 10, the substrate 16 disposed below the light-incident side 11 of the lens member 10, the light source 2 disposed on the substrate 16, the frame 123 supporting the outer peripheral portion of the lens portion 10 so that the center of the light-emitting surface 2a of the light source 2 aligns with the central axis AX of the lens member 10, at least one part 17 mounted on the substrate 16 and disposed inside the frame 123 and below the light-incident side 11 of the lens member 10.

The light-emitting surface 2a of the light source 2 is lesser than the Fresnel-lens surface 14 of the lens member 10 in size and disposed inside the annular inner surface 15a of the annular lens portion 15, and the at least one part 17 is disposed outside the annular lens portion 15.

In the optical unit 120, because the lens member 10 disposed to face the light source 2 includes the annular lens portion 15, the space 19 to dispose, for example, the part 17 for power circuit as one part is secured between the lens member 10 and the substrate 16.

Consequently, the optical unit 120 can be thinned and miniaturized as a whole and has a high use efficiency of the light emitted from the light source 2, and is suitably used for optical products and so on such as illuminators, projectors, flashes, head lamps or tail lamps for a vehicle. In addition, in the optical unit 120, even if the light source 2 is formed by arranging a plurality of LED elements, color unevenness of the LED elements can be prevented.

Figure 8:
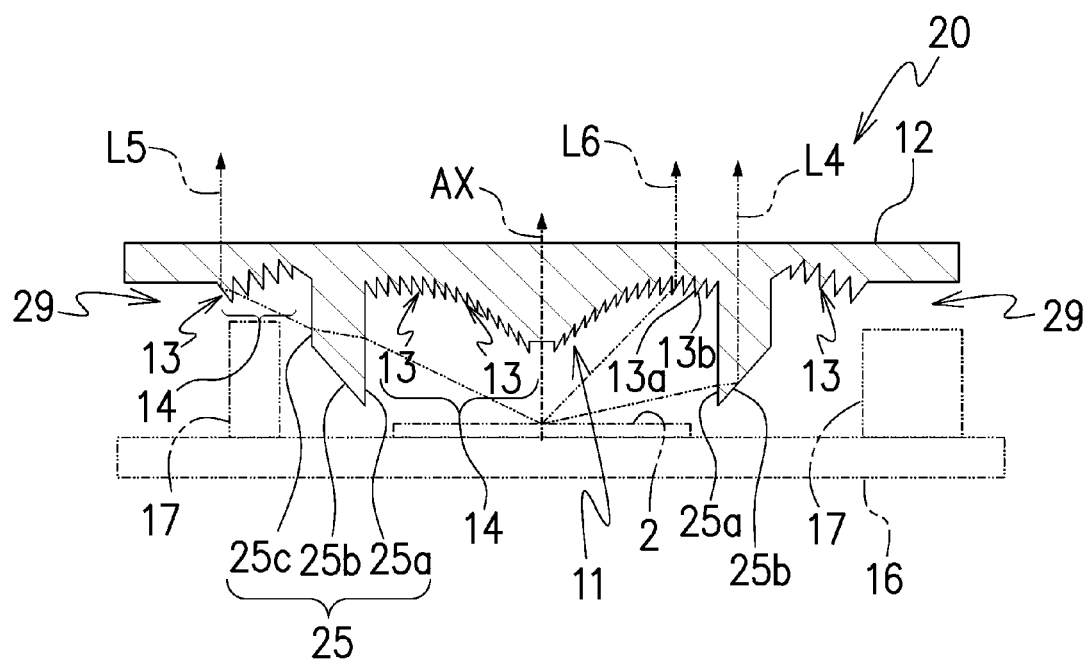
FIG. 8 is a cross-sectional view of a lens member in a second embodiment of the present invention.

FIG. 8 illustrates a lens member according to a second embodiment of the present invention. In a description of the lens member 20 according to the second embodiment, only parts different from the first embodiment with respect to the lens member 20 are described, identical reference numbers are attached to parts similar to that in the first embodiment, a detailed description thereof is omitte.

In the lens member 10 in the first embodiment, the annular lens portion 15 is provided on the outer peripheral portion of the Fresnel-lens surface 14. However, in the lens member 20, there are some of the plurality of annular prisms are positioned outside of the annular outer surface of the annular lens portion. In other words, an annular lens portion 25 is provided on an intermediate portion of the Fresnel-lens surface 14 between the central axis AX and an outer peripheral portion of the Fresnel-lens surface 14, as shown in FIG. 8. That is, in the lens member 20 in the second embodiment, annular prisms 13 of the Fresnel-lens surface 14 are further provided outside the annular lens portion 15.

The annular lens portion 25 includes an annular outer surface 25c to transmit a part of light entered an annular inner surface 25a to direct to the annular prisms 13 that are positioned outside the annular lens portion 25. The annular outer surface 25c has a surface parallel with the annular inner surface 25a in sectional shape. In addition, a lower end of the annular inner surface 25a and a lower end of the annular outer surface 25c extend parallel with the central axis AX below the light-incident side 11, and the annular inner surface 25a extends long more than the annular outer surface 25c. An annular inclined surface 25b is disposed between the annular inner surface 25a and the annular outer surface 25c, and connects the lower end of the annular inner surface 25a and the lower end of the annular outer surface 25c to extend from the annular inner surface 25a to the annular outer surface 25c obliquely and upwardly. The annular inclined surface 25b is a reflection surface reflecting light which is entered the annular inner surface 25a and directed to the inclined surface 25b.

Meanwhile, at least one part 17 for a power circuit is mounted on the substrate 16 below the outer peripheral portion of the Fresnel-lens surface 14 and at an outer peripheral portion of the light source 2 mounted on the substrate 16 in a direction perpendicular to the central axis AX, similarly to the first embodiment. More specifically, the part 17 for a power circuit is disposed on the substrate 16 to face the annular prisms 13 provided outside the annular lens portion 25.

With the lens member 20 structured as mentioned, light L4 reached the annular inclined surface 25b, of lights emitted from the light source 2 at a wide angle with respect to the central axis AX and entered the annular inner surface 25a of the annular lens portion 25 is all reflected on the annular inclined surface 25b toward the light-exit surface 12 and emitted from the light-exit surface 12.

On the other hand, light L5 reached the annular outer surface 25c passes through the annular outer surface 25c, thereafter, the light is entered an inner surface 13a of each of the annular prisms 13 positioned outside the annular lens portion 25 and all reflected on an outer surface 13b of each of the annular prisms 13 an emitted from the light-exit surface 12 of the lens member 12. In other words, light L5 emitted at an angle wider than light L6 reaching the annular prisms 13 positioned inside the annular lens portion 25, of lights emitted from the light source 2 is refracted through the annular inner surface 25a and the annular outer surface 25c of the annular lens portion 25 and all reflected on the annular prisms 13 positioned outside the annular lens portion 25, and emitted from the light-exit surface 12 of the lens member 20. Moreover, the light L4 emitted at an angle wider than the light L5 is emitted from the light-exit surface 12 of the lens member 20 through the annular inner surface 25a and the annular inclined surface 25b, in the annular lens portion 25.

In this way, in the lens member 20 according to the second embodiment, because the annular lens portion 25 is provided annularly about the central axis AX at an intermediate portion of the Fresnel-lens surface 14 between the central axis AX and an outer end portion of the Fresnel-lens surface 14, it is possible to provide a part of the plurality of annular prisms 13 even on an outer side of the annular lens portion 25. In addition, because light entered the annular lens portion 25 is refracted by the annular inner surface 25a and the annular outer surface 25c of the annular lens portion 25, the annular prisms 13 provided outside the annular lens portion 25 can be set at a high position. Consequently, at a position of the annular prisms 13 positioned outside the annular lens portion 25, it is possible to take a large distance between the light-incident side 11 of the lens member 20 and the substrate 16, and secure a large space 29 to house the part 17 for a power circuit at an outer periphery of the annular lens portion 25.

Moreover, because the annular lens portion 25 of the lens member 20 includes the annular outer surface 25c that transmits a part of the light entered the annular inner surface 25a toward the annular prisms 13 that are positioned outside the annular lens portion 25 in a direction perpendicular to the central axis AX, the annular lens portion 24 can be provided inside the outer end portion of the Fresnel-lens surface 14 and a further large space 29 to house the part 17 for a power circuit can be secured outside the annular lens portion 25 in a direction perpendicular to the central axis AX. Furthermore, because the light path of the light transmitting the annular outer surface 25c of the annular lens portion 25 is changed by the annular prisms 13 positioned outside the annular lens portion 25, and the light that the light path is changed is emitted from the light-exit surface 12, it is possible to exert optical characteristics of the lens member even if a space around the light source is used.

Figure 9:
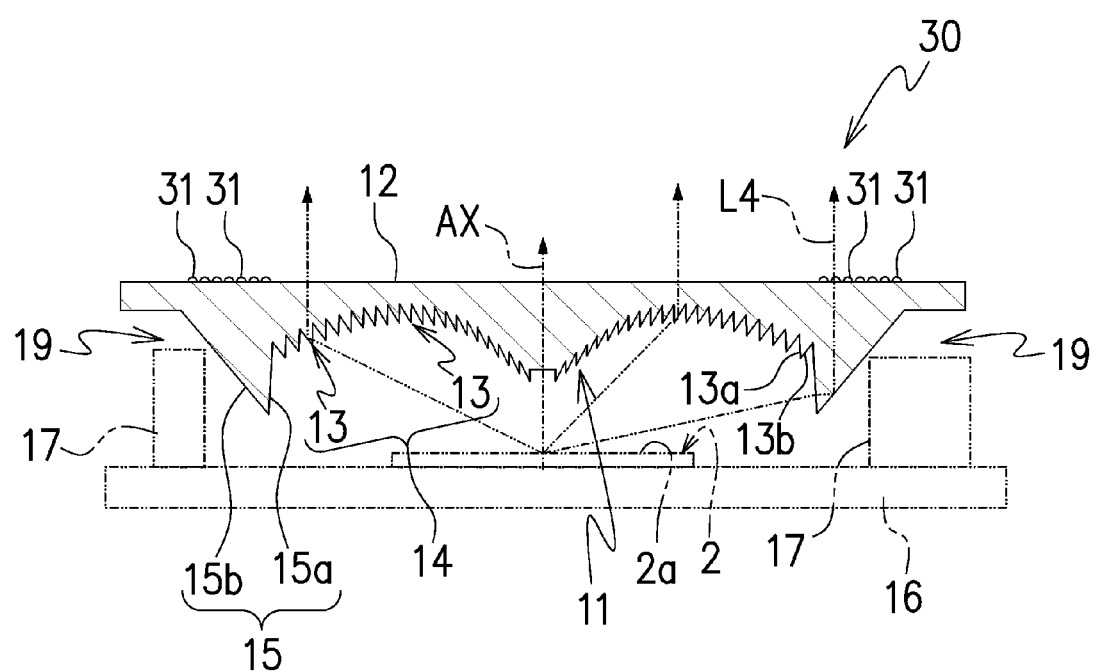
FIG. 9 is a cross-sectional view of a lens member in a third embodiment of the present invention.

FIG. 9 illustrates a lens member according to a third embodiment of the present invention. In the lens member 30 according to the third embodiment, a plurality of convex portions 31 is provided on a part of the light-exit surface 12. In the third embodiment, in particular, the convex portions 31 are provided on the light-exit surface 12 at an above position of the annular lens portion 15 provided on the light-incident side 11 of the lens member 30. The convex portions correspond to an outer peripheral portion of the light-exit surface 12. The convex portions 31 have a function to control at least one of diffusivity and directivity of the light emitted from the light-exit surface 12.

As an example of the convex portions, for example, a plurality of protrusions each having an elliptical shape in section may be annularly arranged on the light-exit surface 12 to diffuse emitted light. In addition, the convex portions are preferably formed in aspheric convex or concave portions. Note that as other convex or concave shapes, for example, square pyramid-like shape convex or concave portions may be used.

In the lens member 30 according to the third embodiment, because the convex portions 31 having a function to control at least one of diffusivity and directivity of light are formed on the light-exit surface 12, it is easy to emit light that a light path is changed by the annular lens portion 15 to be directed toward the light-exit surface 12 by the convex portions 31 or concave portions provided on the light-exit surface 12 for refraction or diffusion of light with a predetermined diffusivity or directivity. For example, a brightness balance between light that a light path is changed to be directed toward the light-exit surface 12 by the annular lens portion 15 and light that a light path is changed by the annular prisms 13 of the Fresnel-lens surface 14, at the light-exit surface 12 can be adjusted, and a distribution of emitted light can be adjusted.

Meanwhile, convex or concave portions may be provided on the light-exit surface 12 of the lens member 30 at a position of the light-exit surface facing the plurality of annular prisms 13 provided on the light-incident side 11 of the lens member 30. In this case, it is possible to reduce color evenness more than the lens member 10 in the first embodiment.

The convex portions 31 or concave portions may be provided inside the annular lens portion 15 on the light-exit surface 12 of the lens member 30. In this case, a more great deal of light can be diffused on a periphery of the central axis AX where color evenness of the light emitted from the light source 2 is easy to be produced and the color evenness can be obtained effectively, by adjusting a degree of diffusivity of light passing through the convex portions 31 or concave portions to be higher than that in a portion of the light-exit surface where the convex portions or concave portions are not provided. In addition, it is possible to obtain a front lighting with the most intensity at a center of the lens member and/or it is possible to obtain narrow directivity due to a low diffusivity in an outer peripheral side of the lens member.

Meanwhile, although some embodiments have been explained, the present invention is not limited to them, and various change and modifications can be made, without departing from the scope of the present invention.

For example, an optical sheet such as a diffusion sheet to diffuse light uniformly, or anisotropic diffusion sheet or prism sheet to diffuse or refract light in a particular direction may be provided optionally on the light-exit surface. With such a optical sheet disposed on the light-exit surface of the lens member, convex or concave portions provided on the light-exit surface directly may be omitted. As such an optical sheet, it is preferable that a material having a smaller refraction index difference than that of a material constituting the lens member is selected.

In this way, the provision of the optical sheet to control at least one of the diffusivity and the directivity of the light transmitting the light-exit surface of the lens member makes it possible to emit easily light that the light path is changed to be directed toward the light-exit surface by the plurality of annular prisms or the annular lens portion of the Fresnel-lens surface, by the refraction and diffusion of the optical sheet provided on the light-exit surface with a desired diffusivity or directivity.

What is claimed is:

1. A lens member comprising:
a central axis;
a light-incident side including a Fresnel-lens surface provided with a plurality of annular prisms that are concentrically arranged with respect to the central axis; and
a light-exit surface opposite to the light-incident side;
the Fresnel-lens surface further including an annular lens portion that is concentrically arranged with respect to the central axis, and that is extended to be longer than the plurality of annular prisms in a direction of the central axis and wider than a total width of at least two annular prisms of the plurality of annular prisms in a direction perpendicular to the central axis.

2. The lens member according to claim 1;
wherein the annular lens portion is positioned at an outer peripheral portion of the Fresnel-lens surface.

3. The lens member according to claim 1;
wherein the annular lens portion includes an annular inner surface and an annular outer surface that is positioned outside the annular inner surface; and
wherein the annular inner surface and the annular outer surface are in contact with each other to form a common lower edge and make an acute angle at the common lower edge.

4. The lens member according to claim 1;
wherein the annular inner surface and the annular outer surface are inclined surfaces having respective angles with respect to the central axis.

5. The lens member according to claim 1;
wherein the annular lens portion includes an annular inner surface, an annular outer surface that is positioned outside of the annular inner surface, and an annular inclined surface connecting a lower end of the annular inner surface and a lower end of the annular outer surface of the annular lens portion.

6. The lens member according to claim 5;
wherein the annular inner surface and the annular outer surface of the annular lens are extended parallel to the central axis and below the light-incident side.

7. The lens member according to claim 5;
wherein the annular inner surface and the annular outer surface of the annular lens portion are extended parallel to the central axis toward below the light-incident side; and
wherein the annular inner surface is extended to be longer than the annular outer surface.

8. The lens member according to claim 1;
wherein the annular lens portion is provided between the central axis and an outer peripheral edge portion of the Fresnel-lens surface and includes an annular inner surface and an annular outer surface that is positioned outside of the annular inner surface; and
wherein some of the plurality of annular prisms are positioned outside of the annular outer surface of the annular lens portion.

9. The lens member according to claim 1;
wherein the annular lens portion is provided at an outer peripheral edge portion of the Fresnel-lens surface and includes an annular inner surface and an annular outer surface that is positioned outside of the annular inner surface; and wherein the lens portion receives light through the annular inner surface and reflects the light at the annular outer surface toward the light-exit surface.

10. The lens member according to claim 1;
wherein the light-exit surface includes a flat surface.

11. The lens member according to claim 10;
wherein the flat surface includes a plurality of convex portions that are provided on the light-exit surface at an annular position above the annular lens portion.

12. The lens member according to claim 1;
wherein the plurality of annular prisms of the Fresnel-lens surface have a continuous surface continuously formed by a concave-shaped surface and a raised surface that is disposed on the central axis and in the center of the concave-shaped surface.

13. A lens member comprising:
a central axis;
a light-incident side including a Fresnel-lens surface provided with a plurality of annular prisms concentrically arranged with respect to the central axis on a continuous surface continuously formed by a concave-shaped surface and a raised surface that is disposed on the central axis and in the center of the concave-shaped surface; and
a light-exit surface opposite to the light-incident side ;
the Fresnel-lens surface further including an annular lens portion that is concentrically arranged with respect to the central axis, and that is extended to be longer than the plurality of annular prisms in a direction of the central axis and wider than a total width of at least two annular prisms of the plurality of annular prisms in a direction perpendicular to the central axis; and
the annular lens portion being extended longer below the light-incident side than the raised surface at the central axis.

14. An optical unit comprising;
the lens member of claim 1;
a light source including a light-emitting surface smaller than the Fresnel-lens surface of the lens member; and
at least one parts disposed below the light-incident side of the lens member and disposed outside of the light source and the annular lens portion in a direction perpendicular to the central axis.

15. An optical unit comprising;
the lens member of claim 13;
a substrate disposed below the light-incident side of the lens member;
a light source including a light-emitting surface smaller than the Fresnel-lens surface of the lens member and disposed on the substrate; and
at least one parts disposed on the substrate below the light-incident side of the lens member and disposed outside of the light source and the annular lens portion in a direction perpendicular to the central axis.

16. The optical unit according to claim 14,
wherein the at least one parts is disposed below the plurality of annular prisms that are positioned in a direction perpendicular to the central axis outside of the annular lens portion.

17. The optical unit according to claim 15,
wherein the at least one parts is positioned below the plurality of annular prisms that are positioned in a direction perpendicular to the central axis outside of the annular lens portion.

18. The optical unit comprising:
a lens member comprising a central axis, a light-incident side including a Fresnel-lens surface provided with a plurality of annular prisms that are concentrically arranged with respect to the central axis, and a light-exit surface opposite to the light-incident side, the Fresnel-lens surface further including an annular lens portion that is concentrically arranged with respect to the central axis and that is extended to be longer and wider than the plurality of annular prisms;

a substrate disposed below the light-incident side of the lens member;

a light source including a light-emitting surface and provided on the substrate;

a frame supporting an outer peripheral portion of the lens member with the central axis of the lens member and a center of the light-emitting surface of the light source being coincident with each other; and at least one parts provided on the substrate within the frame below the light-incident side of the lens member;

the light-emitting surface of the light source being smaller than the Fresnel-lens surface of the lens member and positioned inside the annular inner surface of the annular lens portion in a direction perpendicular to the central axis; and the at least one parts being positioned outside of the annular lens portion in the direction perpendicular to the central axis.

19. The optical unit according to claim 15 further comprising:

a frame supporting an outer peripheral portion of the lens member with the central axis of the lens member and a center of the light-emitting surface of the light source being coincident with each other.

20. The lens member according to claim 1, wherein the annular lens portion includes an annular inner surface and an annular outer surface that is positioned outside the annular inner surface, and wherein a chamfer is provided between the annular inner surface and the annular outer surface.

21. The optical unit according to claim 18, wherein the annular lens portion of the lens member includes an annular inner surface and an annular outer surface that is positioned outside the annular inner surface, and wherein a chamfer is provided between the annular inner surface and the annular outer surface of the annular lens portion of the lens member.

* * * * *